Oct. 13, 1970     H. F. ROBBINS ET AL     3,533,872
METHOD OF MAKING A COVE MOLDING IN A CONTINUOUS
LAMINATED PROCESS
Filed May 1, 1967     2 Sheets-Sheet 1
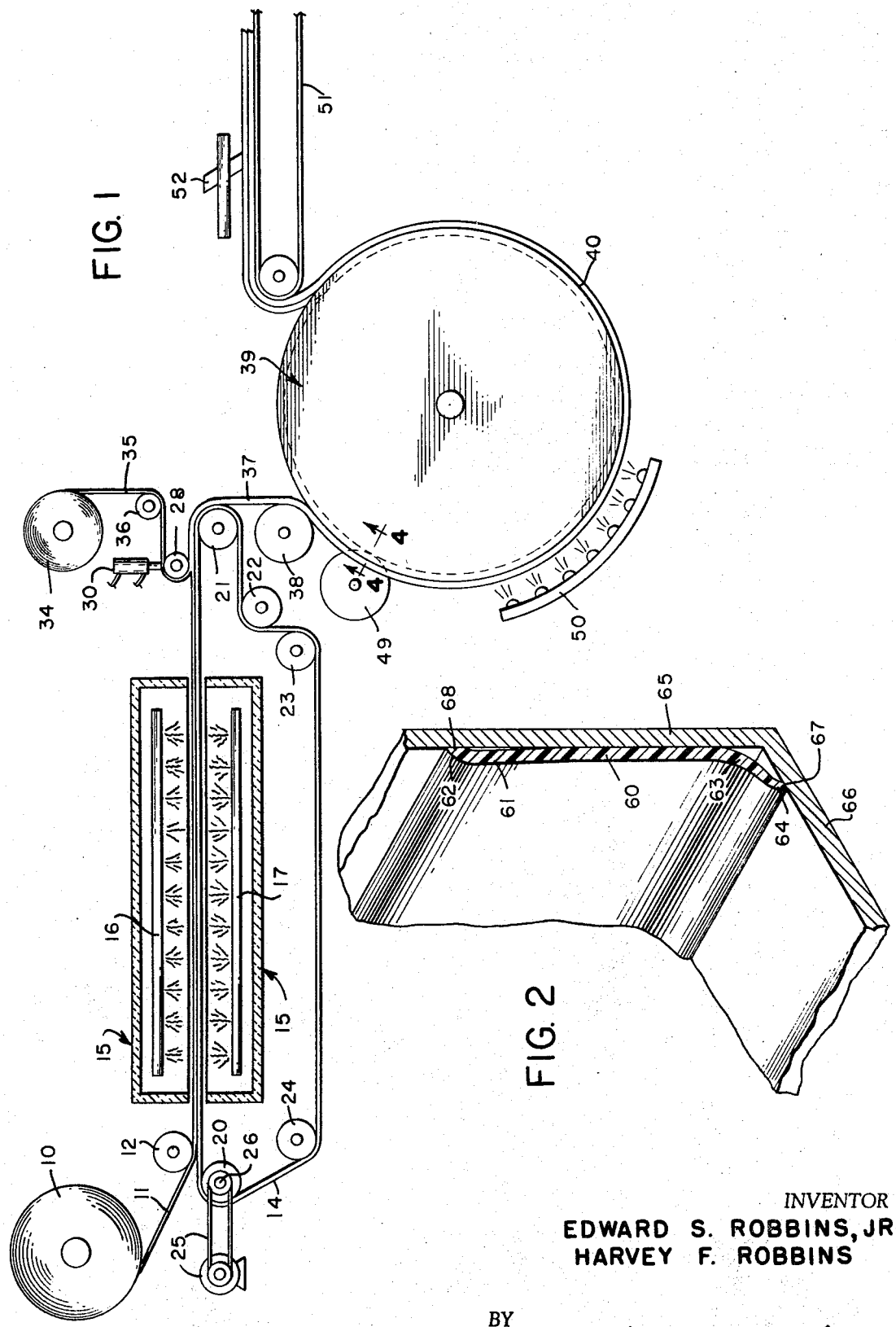
INVENTOR
EDWARD S. ROBBINS, JR
HARVEY F. ROBBINS
BY
ATTORNEYS

INVENTOR
EDWARD S. ROBBINS, JR
HARVEY F. ROBBINS

3,533,872
METHOD OF MAKING A COVE MOLDING IN A
CONTINUOUS LAMINATED PROCESS
Harvey F. Robbins and Edward S. Robbins, Jr., Tuscumbia, Ala., assignors to National Floor Products Company, Inc., Florence, Ala.
Filed May 1, 1967, Ser. No. 635,119
Int. Cl. B29c 5/00
U.S. Cl. 156—245           7 Claims

ABSTRACT OF THE DISCLOSURE

A thin layer of polyvinyl chloride of desired design is attached to a substrate of filled polyvinyl chloride by heat and pressure while hot and the laminated material is molded in a continuous operation by winding it around a large drum having a surface of special configuration on which it is formed and cooled. From the drum the material is slit lengthwise to form a plurality of widths of cove molding of unusual dimensional stability.

---

This invention relates to building materials and more particularly to an improved molding, especially of the cove type, and to the apparatus and process by which it is manufactured.

Decorative cove moldings have heretofore been manufactured in many ways including by extrusion and high compression procedures. Extrusion molding, while capable of being formed in a continuous process, requires relatively expensive raw materials, inherently has internal stresses caused by the extrusion process, suffers from a lack of dimensional stability, and is restricted in the patterns that can be formed, as well as having other disadvantages.

High compression molding is uneconomical, is limited in production capacity, and can be manufactured only in relatively short lengths.

An object of the present invention is to produce a superior cove molding more economically.

A further object of the invention is to produce a cove molding which is improved as to dimensional stability over molding produced by processes previously known.

A further object is the provision of apparatus and a procedure for manufacturing laminated plastic materials adapted for a variety of uses such as, but not limited to, cove molding.

Figure 3:
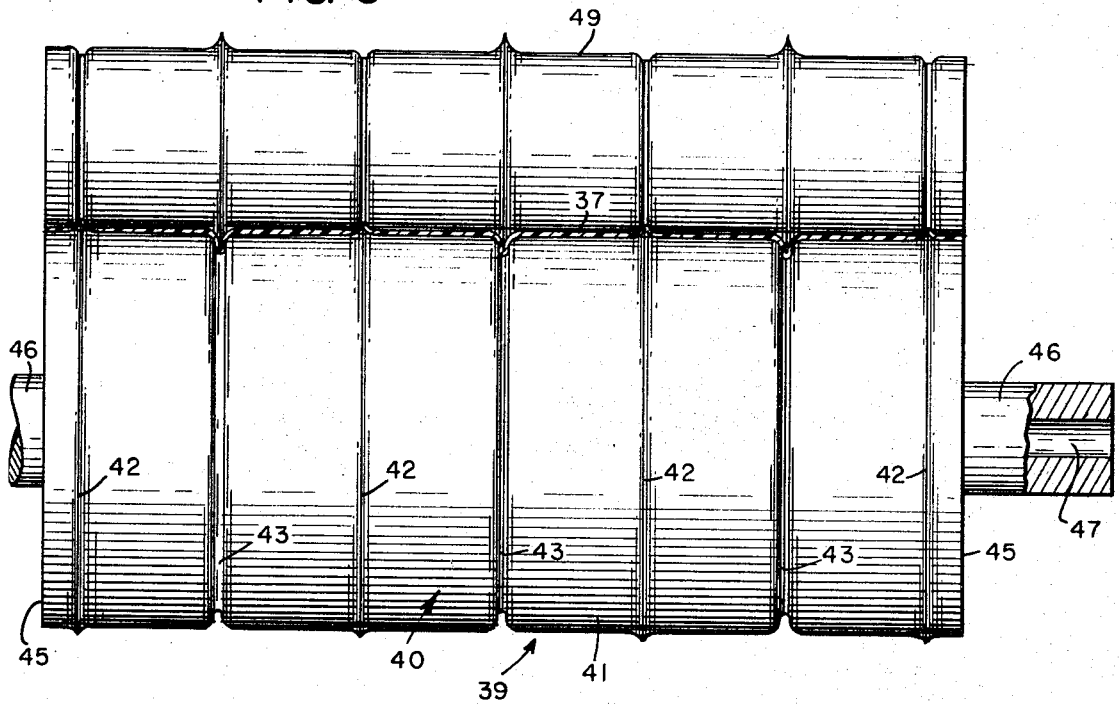
Figure 4:
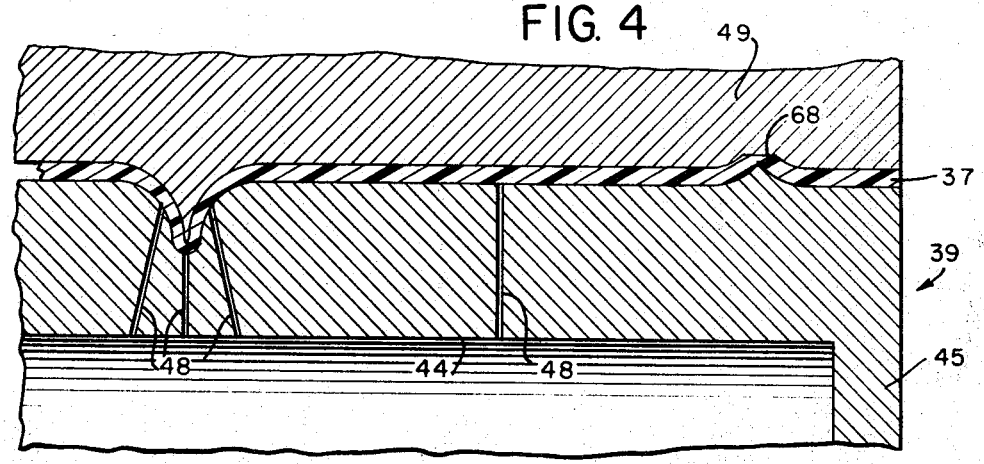
Figure 5:
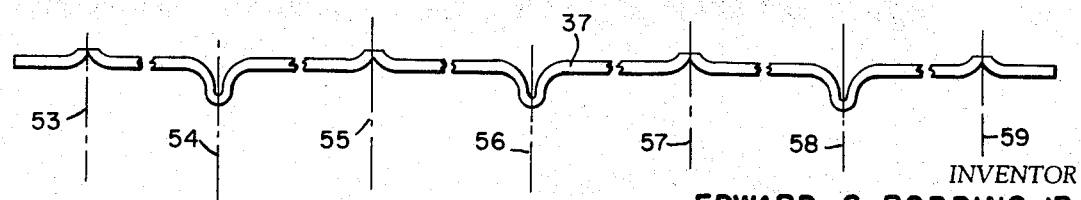

These and other objects of the invention will become apparent from the following description taken in conjunction with the accompanying drawings in which:

FIG. 1 is a schematic of the method of making a cove molding;

FIG. 2, a perspective illustrating one application of the finished article;

FIG. 3, a plan view of the forming rollers of FIG. 1;

FIG. 4, an enlarged fragmentary section on the line 4—4 of FIG. 1; and,

FIG. 5, a fragmentary section of the formed web of material.

Briefly stated the present invention provides for the laminating in a continuous process of a relatively thin film of dimensionally unstable polyvinyl chloride or other material to a much thicker web of base or substrate of dimensionally stable polyvinyl chloride having the major portion thereof of relatively stable and inexpensive fillers. This is done by gradually heating at least the substrate and then applying and fusing the thin film thereto under moderate pressure, after which the laminated material is rolled around the circumference of a relatively large drum having a cross-section configuration on its periphery which corresponds to the desired cross-section of the finished product, cooling the laminated material as it passes around the drum, drawing it from the drum and slitting it lengthwise along lines corresponding to the widths of molding that have been formed. The molding thus formed, due to the nature of the raw material and the forming process and apparatus is relatively inexpensive, can have various designs, is dimensionally stable, is formed in a continuous process, and will impart an illusion of greater than actual thickness when it has been applied to a wall.

With further reference to the drawings, a roll or other supply 10 of base material or substrate is provided which may be of indeterminate length and of a desired width and thickness, a width of 28″ and a thickness in the range of 0.080″–0.125″ having been found satisfactory. This material preferably has a binder content of approximately 35% polyvinyl chloride or other thermoplastic material and approximately 65% fillers such as ground marble, calcium carbonate, or other dimensionally stable material. These amounts are primarily a matter of choice, it being understood that the fillers promote dimensional stability in the product and are less expensive than polyvinyl chloride. The relative proportions of the polyvinyl chloride and filler depend somewhat upon the ability to mix the two, it being necessary that the polyvinyl chloride serve as a binder for the filler. Preferably the base material is colored a neutral shade of gray, tan, brown or other neutral color which corresponds generally to the color of the finished product. Also it is noted that if the finished product is to be white, then white pigments will be added to the base material. Filled polyvinyl chloride of this nature is a well known product and commonly available in the trade.

A web 11 of the base material or substrate is removed from the roll 10 and fed over roller 12 into contact with an endless conveyor 14 the upper run of which passes through a heating unit 15. The endless conveyor 14 may be formed of any desired material such as a Teflon impregnated asbestos material approximately $3/16''$ thick. The heating unit 15 has opposed banks of heaters 16 and 17 which may be of the gas burner or electric radiant type and are positioned above and below the base material 11 and the belt 14.

In order that the material may be heated adequately and gradually with a sufficient production rate, a heating unit with an effective heated run of approximately 60 feet has been used in which the conveyor 14 operates at a speed of approximately 30–50 feet per minute. The conveyor passes around rollers 20, 21, 22, 23 and 24 which are suitably supported, driving means 25 of suitable nature being provided for shaft 26 of the roller 20.

During the heating process, stresses and strains which may have been present in the base material are relieved when such material is heated to approximately 320° F. before passing under a pressure roller 28 at the discharge side of the heating unit. Roller 28 is urged downwardly against the material on the belt by hydraulic mechanism 30, the force of which may be closely controlled. For the embodiment described, a force of 100 lbs. has been found to be satisfactory.

At the end of the heating unit 15 remote from the roll 10 is a roll 34 of relatively thin generally opaque film 35 which is to be laminated to the web of the substrate. The film, which is approximately 0.003″ in thickness, may be substantially pure polyvinyl chloride except for small amounts of plasticizers, stabilizers, color pigments, and other materials which may be desired for the surface finish and decorative pattern. The opaque film may be of any desired color and may have a design such as a wood pattern, basketweave pattern, grained pattern or other surface effect which can be applied by well known printing procedures.

3

From the roll 34, the film 35 passes around a roller 36 and then to the vicinity of the heating unit 15 so that the film may be exposed to heat and preferably reaches a temperature of approximately 120° F. Thereafter the film 35 passes around the roller 28 where the heat to which the web of substrate 11 and the film 35 have been exposed, together with the pressure applied by the hydraulic mechanism 30, is sufficient to permanently fuse the film and the web of substrate into an integral laminate 37. Such laminate then passes over the roller 21 and a guide roller 38 and is discharged onto the surface of a relatively large drum 39, whose diameter, in one example, is six feet. It is noted that the film 35 may be provided with an independent source of heat or may not be heated since the heat of the web of substrate would be sufficient to fuse the substrate and the film together. Also, due to the thinness of the film, such film could be rapidly heated by heat transfer from the web of substrate.

The drum 39 is of generally cylindrical configuration having an outer surface 40 including a plurality of generally flat areas 41 terminating in annular enlargements 42 at one end and annular recesses 43 at the other end. The drum 39 is generally hollow throughout its length and has an internal bore 44 closed by end members 45. Each of the end members 45 is provided with a stub shaft 46 so that the drum can be rotatably supported in journals (not shown) and driven at a surface speed substantially equal to the speed of the belt 14. In order to remove air which may be trapped between the laminate 37 and the drum 39 and to cause such laminate 37 to adhere closely to the outer periphery of the drum 39, one of the stub shafts 46 is provided with a bore 47 connected to a source of vacuum (not shown) so that a negative pressure or partial vacuum can be created within the internal bore 44 of the drum. A plurality of orifices 48 provide communication between the internal bore 44 and the outer surface 40 of the drum, particularly in the area of the annular recesses 43 so that any trapped air between the laminate and the drum will be exhausted into the drum and the laminate will be drawn into intimate engagement with the outer surface 40. The orifices 48 may be on the order of 0.010" diameter and spaced closely adjacent to the recesses 43. The source of negative pressure has sufficient capacity to maintain a partial vacuum even though an area of holes in the drum 40 is uncovered.

In order to cause the laminate 37 to conform to the configuration of the drum 39, a forming roller 49, whose diameter in one embodiment is 6", having a configuration complementary to the outer surface of the drum is located adjacent to such outer surface and spaced therefrom a distance substantially corresponding to the thickness of the laminate 37. It is noted that due to the forming process the thickness of the material of the laminate will be thinner at the base of the recesses 43. After the laminate has been formed it is subjected to a cooling unit 50 which directs a stream of water or cold air onto the laminate to cause the laminate to take a permanent set.

After the laminate has taken a permanent set it is discharged from the drum 39 onto an endless conveyor 51 where it is subjected to a series of slitting knives 52 which subdivide the laminate along predetermined lines 53, 54, 55, 56, 57, 58 and 59 (FIG. 5) to separate the laminate into strips of appropriate widths and shapes.

As illustrated in FIG. 2 the cove molding, which has been formed in the manner described above, has a relatively straight main portion 60 of predetermined thickness with an upper portion 61 of reduced thickness terminating in a curved upper edge 62. At the lower end the molding has an outwardly curved portion 63 terminating in a toe or lip 64 so that when the molding is applied the main and upper portions will engage a wall 65 and the toe 64 will engage a floor 66 at a distance from the wall 65.

By forming and slitting the cove molding as described, the toe 64 is provided with a flat portion 67 which is adapted to maintain close contact with the floor thereby providing a seal against dirt and moisture. The outer curvature of the toe with the flat portion 67 also provides an appearance of thickness of the molding when viewed in its installed position. Similarly, the upper curved portion 62 also has a flat portion 68 which engages the wall, the curvature of the upper portion and the engagement of the flat area likewise producing an appearance of thickness of the molding. Additionally, the engagement of the flat portion 68 with the wall prevents the seeping out of adhesive between the wall and the rear of the molding, such adhesive being utilized to attach the molding to the wall. The radius of curvature of the toe 64 and the upper curved portion 62 may be increased to provide an even greater appearance of thickness. This appearance of thickness is desired by contractors and home owners as it is an indication of higher quality and sturdiness.

Due to the fact that the laminate 37 is formed into a circular shape while hot, the subsequent straightening of the outwardly curved portion 63 and the toe 64 to a substantially flat condition will result in a tension which will assist the toe to hold its proper shape. Without this condition the curved portion 63 and the toe 64 would have a tendency to return to their original flattened condition while stored.

Also, since the film is dimensionally unstable, it has a much greater coefficient of expansion and contraction than the substrate 11. When heat is applied, both the film and the substrate expand and as soon as they are laminated, the resulting laminate 37 is formed on the drum 39 by the forming roller 49 and thereafter immediately cooled. The cooling of the laminate causes a suddent contraction and since the film contracts at a greater rate than does the base, a tightening of the surface or a prestressing results and the effect is to tend permanently to maintain the toe 64 in its formed shape and to return it thereto if it is bent out of such shape for any reason.

The substrate of the present invention may be formed from scrap that would be unacceptable to other manufacturing procedures. Not only may contaminated scrap be used, but the waste from a particular manufacturing operation may be reworked thereby eliminating waste materials. The substrate may be colored a neutral color and covered over with a relatively thin film as described of opaque printed material.

In the operation of the device a web of base material 11 having a relatively high filler content of dimensionally stable material is heated to an elevated temperature and thereafter a thin film of material having the desired surface effect is fused to the base material by heat and pressure to provide a desired laminate 37. Such laminate is guided onto a relatively large drum 39 having a series of ridges and valleys or recesses which are in communication with the internal bore of the drum and to which a negative pressure or partial vacuum has been applied by means of a multiplicity of relatively small orifices. As soon as the laminate 37 is guided onto the drum a forming roller 49 having an external surface complementary to the configuration of the drum and spaced therefrom a distance corresponding substantially to the thickness of the laminate causes the laminate to be drawn into intimate engagement with the outer surface of the drum and thereafter such laminate is held in position by the negative pressure within the drum. After the laminate has been formed, it is subjected to a cooling unit 50 which causes the laminate to take a permanent set and thereafter the laminate is discharged from the drum onto an endless conveyor where it is subjected to a plurality of slitting knives 62 which separate the laminate into a plurality of strips of the desired width and configuration.

After the molding strips have been separated they may be coiled into individual coils for shipping or may be severed into predetermined lengths. The fusing of the opaque film 35 to the base material 11 permits the cove molding to be bent around corners and the like without causing objectionable discoloration as is normal with conventional materials having a high filler content. Also the film 35 may have marbleizing or other designs and colors formed therein which is not possible with conventional cove moldings formed in a continuous process.

Since the base material has a high percentage of fillers which are more dimensionally stable with temperature change than the pure plastic, the resulting product is likewise of improved dimensional stability. As a result, at temperatures, say below 60° F., at which ordinary polyvinyl chloride is not pliable and hence difficult to install, the material of the present invention remains pliable and does not suffer from this shortcoming.

What is claimed is:

1. The method of making a cove molding in a continuous process comprising the steps of: providing a web of base material having a relatively high filler content of dimensionally stable material, heating said web to a fusible temperature, fusing a thin film of relatively pure thermoplastic material to said base material after the base material has been heated, moving the resulting laminate onto a relatively large substantially cylindrical rotatable drum having an outer surface with substantially flat areas connected by raised and indented areas, closely spacing a cooperating substantially smaller forming roller adjacent to said drum having a surface configuration complementary to the configuration of said drum, moving said laminate between said drum and said roller to cause said laminate to conform closely with the exterior configuration of said drum, cooling said laminate while on the drum and after it has been formed, and removing said laminate from said drum, whereby a cove molding of indeterminate length and a desired width will be formed in a continuous process.

2. The method of claim 1 in which the base material includes polyvinyl chloride with a filler of calcium carbonate, the filler content being greater than 50% by weight of the combined mass.

3. The method of claim 1, in which the base material is approximately 0.080″–0.125″ thick and the film is on the order of 0.003″ thick.

4. The method of claim 1 including the additional steps of providing at least one blade for separating said laminate into a plurality of moldings of indeterminate lengths after removing said laminate from said drum.

5. The method of claim 1 including the additional step of heating said film prior to fusing the film to the base material.

6. The method of claim 1, in which the film has a desired decoration visible on its outer surface from the base material.

7. The method of making a cove molding in a continuous process comprising the steps of: providing a web of base material including a thermoplastic material and a relatively high filler content, heating said web to a fusible temperature prior to the application of a thin film thereto, fusing a thin film of relatively pure thermoplastic material to one surface of said web to form an integral laminate, moving said laminate onto a relatively large substantially cylindrical rotatable drum while the laminate remains warm, said drum having an outer surface with a plurality of substantially co-planar flat portions, one end of adjacent flat portions being connected by indented portions and the opposite end of adjacent flat portions being connected by raised portions, closely spacing a cooperating substantially smaller forming roller adjacent to and generally parallel with said drum, said forming roller having a surface configuration complementary to the configuration of said drum, moving said laminate between said drum and said roller to cause said laminate to conform closely with the surface of said drum, cooling said laminate while on the drum after it has been formed, removing said laminate from said drum, and slitting said laminate into a plurality of moldings of indeterminate lengths after removing said laminate from said drum.

References Cited

UNITED STATES PATENTS

| | | | |
|---|---|---|---|
| 2,318,111 | 5/1943 | Steinberger | 264—284 |
| 2,446,771 | 8/1948 | Knowland | 264—284 |
| 2,585,915 | 2/1952 | Chavannes | 264—284 |
| 2,776,451 | 1/1957 | Chavannes | 264—284 |
| 2,849,752 | 9/1958 | Leary | 264—284 |
| 3,196,062 | 7/1965 | Kristal | 264—284 |
| 3,192,294 | 6/1965 | Streed et al. | 264—284 |

CARL D. QUARFORTH, Primary Examiner

G. SOLYST, Assistant Examiner

U.S. Cl. X.R.

156—285, 500; 264—294